United States Patent [19]

McNair

[11] Patent Number: 5,438,486
[45] Date of Patent: Aug. 1, 1995

[54] HEADLIGHTS WITH VARIABLY SHAPED OPTICAL ELEMENTS

[76] Inventor: Edward P. McNair, 59 Chimney Ridge Dr., Convent Station, N.J. 07961

[21] Appl. No.: 916,373

[22] Filed: Jul. 20, 1992

[51] Int. Cl.⁶ .................................................. B60Q 1/064
[52] U.S. Cl. ...................................... 362/61; 362/278; 362/318; 362/319
[58] Field of Search ............... 362/61, 318, 319, 284, 362/278, 101, 96

[56] References Cited

U.S. PATENT DOCUMENTS

| | | | |
|---|---|---|---|
| 1,572,623 | 2/1926 | Staley | 362/319 X |
| 2,576,581 | 11/1946 | Edwards | |
| 3,031,928 | 5/1962 | Kopito | |
| 3,254,342 | 5/1966 | Miller | |
| 3,598,479 | 8/1971 | Wright | 351/159 |
| 3,609,339 | 9/1971 | Smith | 362/283 |
| 3,839,632 | 10/1974 | Federico | 362/278 |
| 3,860,811 | 1/1975 | Slauter | 362/202 |
| 4,075,472 | 2/1978 | Higuchi | 362/255 |
| 4,163,276 | 7/1979 | Tabatchnik-Michaeli | 362/278 X |
| 4,460,943 | 7/1984 | Callahan | 362/278 X |
| 4,466,706 | 8/1984 | Lamothe, II | 350/419 |
| 4,514,048 | 4/1985 | Rogers | 350/423 |
| 4,783,153 | 11/1988 | Kushibiki et al. | 350/409 |
| 4,783,155 | 11/1988 | Imataki et al. | 350/423 |
| 4,855,884 | 8/1989 | Richardson | 362/278 |
| 4,857,794 | 8/1989 | Watanabe | 313/113 |
| 4,913,536 | 4/1990 | Barnea | 350/419 |
| 5,023,758 | 6/1991 | Allen et al. | 362/61 |
| 5,060,120 | 10/1991 | Kobayashi et al. | 362/61 |
| 5,068,768 | 11/1991 | Kobayashi | 362/61 |
| 5,105,342 | 4/1992 | Zillgitt et al. | 362/66 |
| 5,138,540 | 8/1992 | Kobayashi et al. | 362/268 |
| 5,142,455 | 8/1992 | Kosmatka | 362/61 |

FOREIGN PATENT DOCUMENTS

| | | | |
|---|---|---|---|
| 2415285 | 10/1975 | Germany | 362/319 |
| 442466 | 11/1948 | Italy | 362/318 |
| 297182 | 9/1928 | United Kingdom | 362/319 |
| 0259565 | 4/1981 | United Kingdom | 362/61 |

OTHER PUBLICATIONS

Levine, "Theatre Size Home TV", Popular Science, Feb. 1988, p. 78.

Caudell et al., "Active Optics with RTV Silicone Rubber", SPIE, vol. 115, Advances in Replicated & Plastic Optics, pp. 18–24, 1977.

Handbook of Chemistry & Physics, 72nd Ed., CRC Press, Inc., Boca Raton, Fla., p. 3–242, No. 6883 (No).

*Primary Examiner*—Carl D. Price

[57] ABSTRACT

Variably shaped lenses that adjust the shape of the light beam of vehicle headlights. The shape of the lenses is changed by the transfer of a liquid between the lens assembly and an external cylinder. Baffles are used in the refracting portion of the lens to prevent shifting of the liquid and distortion of the lens when the vehicle accelerates.

12 Claims, 5 Drawing Sheets

HEADLIGHTS WITH VARIABLY SHAPED OPTICAL ELEMENTS

BACKGROUND OF THE INVENTION

1. Field of the Invention

The present invention pertains to vehicle headlights whose light beam patterns can be adjusted by changing the shape of lenses that modify the headlight beams.

2. Description of Prior Art

Heretofore it has been the practice to adjust the distribution of the illumination from a vehicle's headlights by altering the position or distance between the glower and modifier or the glower and reflector. In the dual filament high beam-low beam headlight used on highway vehicles, the headlight actually contains two glowers and two electrical circuits which are energized alternately. The dual filament headlight has only two settings; high beam, when there is no oncoming traffic; and low beam when the high beam would cause too much glare for the driver of an oncoming vehicle, too much glare in the rear view mirrors of a vehicle ahead, or, in the case of fog or falling snow, too much reflective glare for the vehicle operator. A way that is currently used to achieve some degree of versatility in illuminating a vehicle's path is by using additional lights and wiring systems such as automobile quad headlights, and fog lights.

Around 1980, Halogen and other arc discharge glowers started to be used on car headlights in the United States. These types of light sources produce approximately five times the candlepower that regular incandescent headlights do. While they increase visibility somewhat, with the limited amount of adjustment that can be made to the beam direction and shape, their full potential to illuminate cannot be realized and, conversely, these powerful lights would make a more versatile system of adjustment an even greater benefit to driving safety.

There have been patents issued for variable shaped (sometimes referred to as variable focus) lenses over the years. Almost all of the objects of these patents require a relatively high degree of precision. Examples are lenses for image formers such as eyeglasses and cameras, or for concentrating light on extremely small targets in laser applications. Such applications have not had commercial success since ground or moulded lenses of glass or plastic achieve a higher degree of precision than the adjustable shape lens is capable of achieving. However the shape of a headlight beam is much less precise. Even the narrowest, most concentrated headlight beam is designed to be wider as it projects forward than it is at the aperture of the headlight, and sufficiently accurate adjustment of the light beam for height and shape could be achieved with variably shaped lenses.

Italy patent 442466 (Rappazzo, 23 Nov. 1948) shows a vehicle headlight with an variably shaped lens. In the Rappazzo patent two transparent walls forming a chamber that is filled with a transparent liquid comprise the lens through which light from the glower and reflector pass. The method of adjusting the shape of the lens is by adding or removing the liquid to the chamber so that the chamber expands or contracts. The operation of this device is similar to the operation of the lens in the preferred embodiment of my invention.

Such a lens containing a liquid would offer significant advantages over current types of headlights; however, a major problem of liquid lenses in moving vehicles is the shifting of the liquid and, therefore, the distortion of the lens to an unacceptable degree whenever the vehicle changes speed or direction. In the case of a moving highway vehicle, in addition to changes of speed, changes of direction are continuously caused by vibration and turning.

SUMMARY OF THE INVENTION

Objects and Advantages

The object of the present invention is to provide variably shaped lenses that are not subject to distortion caused by acceleration, in vehicle headlight systems. When the distortion is minimized, sufficiently accurate adjustment of the headlight beam can be achieved while the vehicle is in motion. The advantages of such headlights are that they:

(a) provide a continuous range of light beam adjustment for vehicle headlights;

(b) reduce the number of glowers needed in headlight systems;

(c) incorporate in a single headlight the capability of providing one or more high, intermediate, and low beams;

(d) vary the width and direction of the beam from a headlight thus duplicating the performance of auxiliary fog and driving lights;

Still further objects and advantages will become apparent from a consideration of the ensuing description and drawings.

DESCRIPTION OF THE INVENTION

Figure 1A:
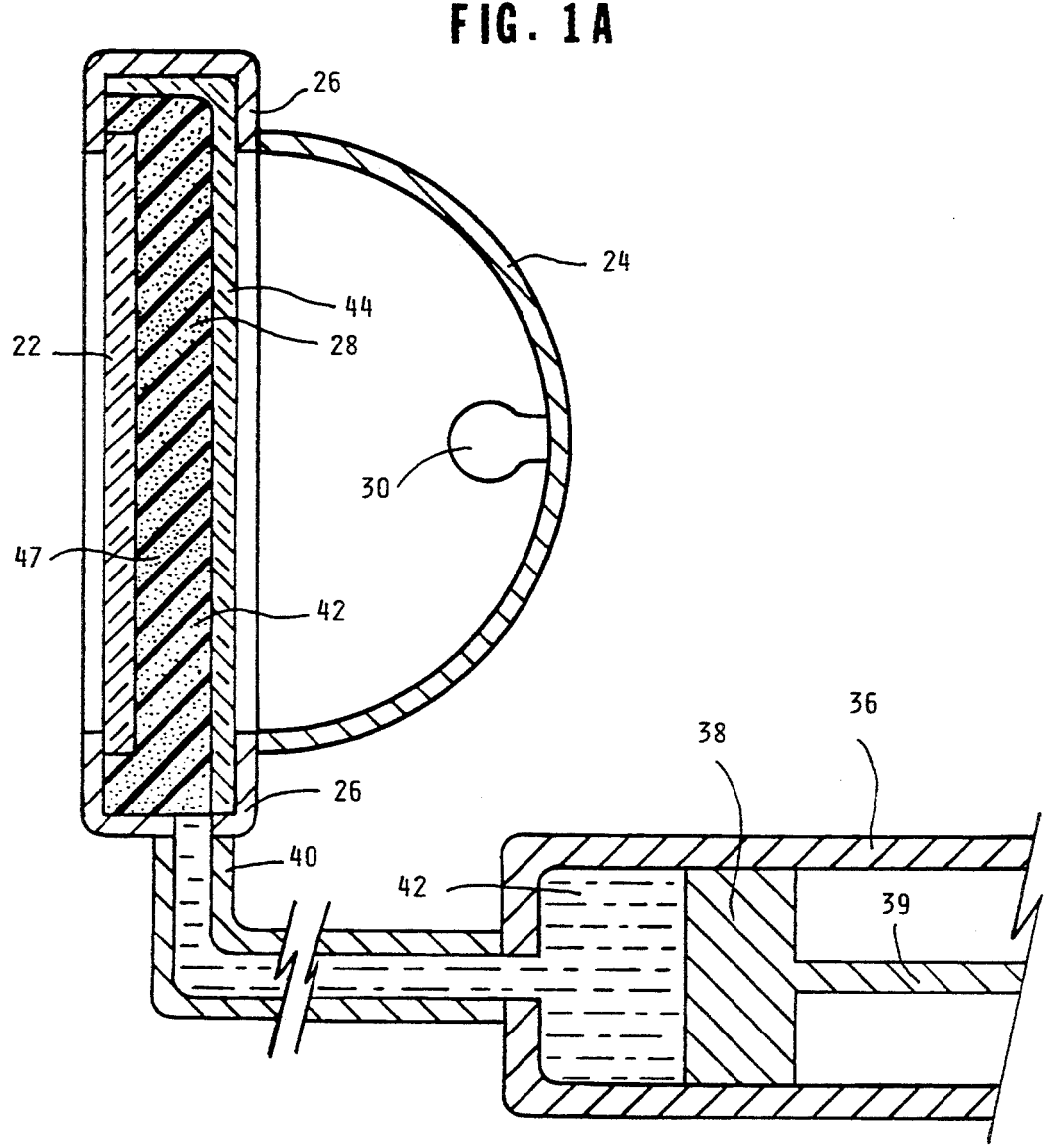
FIGS. 1A to 1D are different aspects of a headlight with an adjustable lens system containing a liquid.
Figure 2A:
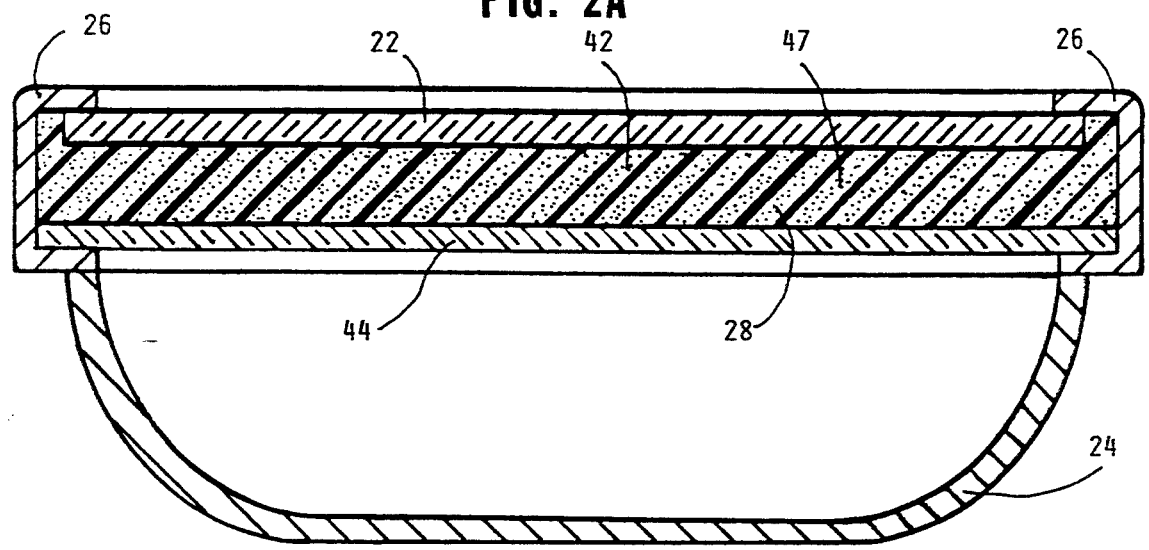
FIGS. 2A to 2G show different aspects of this system.

The preferred embodiment of the invention, illustrated in FIGS. 1A through 1D and FIGS. 2A through 2C, is a headlight assembly (20) having a reflector (24), a rim (26), a glower (30), and a liquid filled lens assembly (21). Lens assembly (21) has a transparent rigid outer wall (22), and a transparent deformable inner wall (44). Outer wall (22) and inner wall (44) fit inside a rim (26) to form a chamber (28). High pressure tubing (40) connects chamber (28) to a cylinder (36). Cylinder (36) is sealed at its end by a movable piston (38). Piston (38) contains an integral piston rod (39) that is connected to a conventional servo motor and gear (not shown). Sponge rubber (47) made of a transparent silicone rubber is partially compressed and fully occupies chamber (28). A transparent liquid (42) such as an aqueous solution of ethylene glycol fills cylinder (36), tubing (40) and chamber (28) so that sponge rubber (47) is immersed in liquid (42).

When sponge rubber (47) is immersed in liquid (42) with a similar index of refraction, it will be transparent and virtually invisible. An example of transparent sponge rubber material is General Electric RTV-602 Silicone Rubber which has an index of refraction of 1.408. An aqueous solution of 76% ethylene glycol would match an index of refraction of 1.408 very closely.

FIGS. 1A (side view) and 2A (top view) depict lens (21) adjusted so there is no significant refraction of the headlight beam. If reflector (24) were to have a parabolic shape, and glower (30) were to be at the focal point of reflector (24), the result would be a narrow high beam.

When some liquid is added or removed from chamber (28) the volume of chamber (28) will increase or decrease so that chamber (28) remains full of liquid. This will cause the shape of lens (21) to change in a continuous, controlled manner. Since it is partially compressed, the sponge rubber will conform to the shape of the chamber as the liquid is added or removed.

Figure 1B:
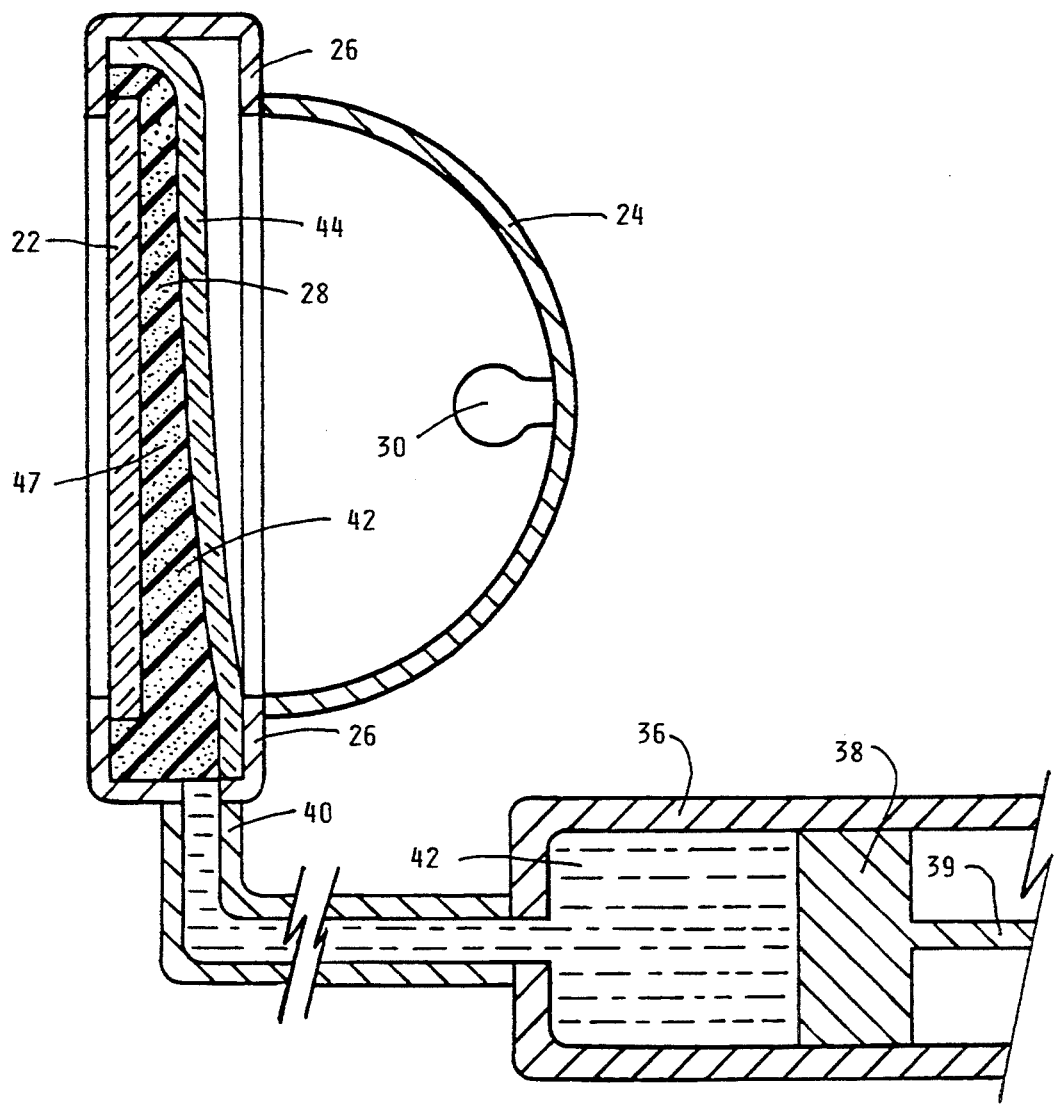
Figure 2B:
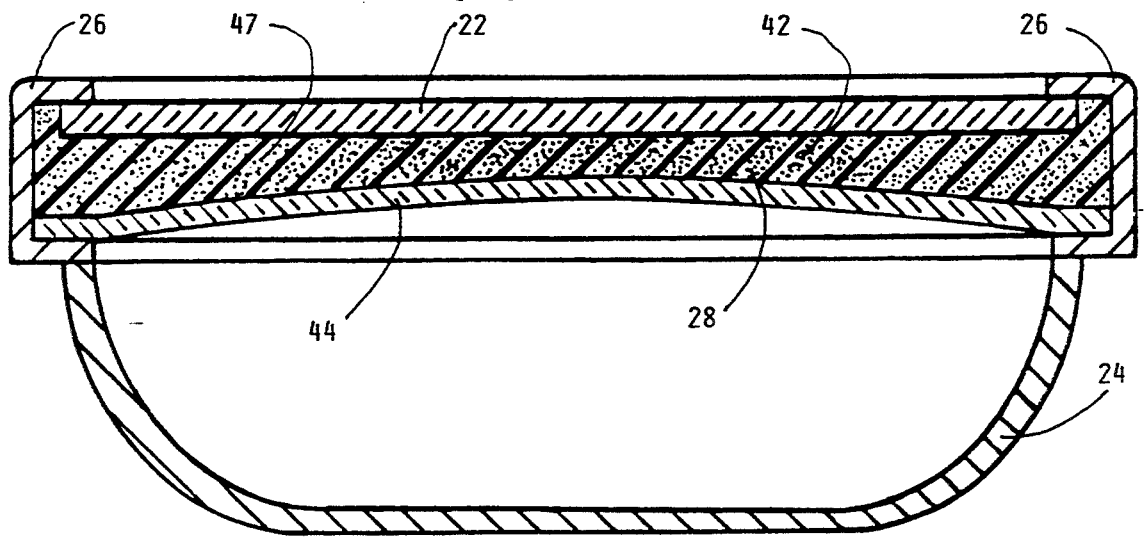

FIGS. 1B and 2B illustrate headlight assembly (20) with a small amount of liquid (42) removed from chamber (28) so that lens assembly (21) takes the shape of the bottom half of a plano-concave lens. Concave lenses are divergent and the headlight beam has been lowered and widened to an intermediate position suitable for several driving conditions; for example, driving on divided highways when there is other traffic.

To remove a portion of the liquid from the chamber (28), piston rod (39) and piston (38) are partially retracted from cylinder (36) by a servo motor and worm gear (not shown). As piston (38) is retracted, either atmospheric pressure, or flexible wall (44) returning to its natural shape, or both would cause a portion of liquid (42) to enter high pressure tubing (40) and cylinder (36).

Figure 1C:
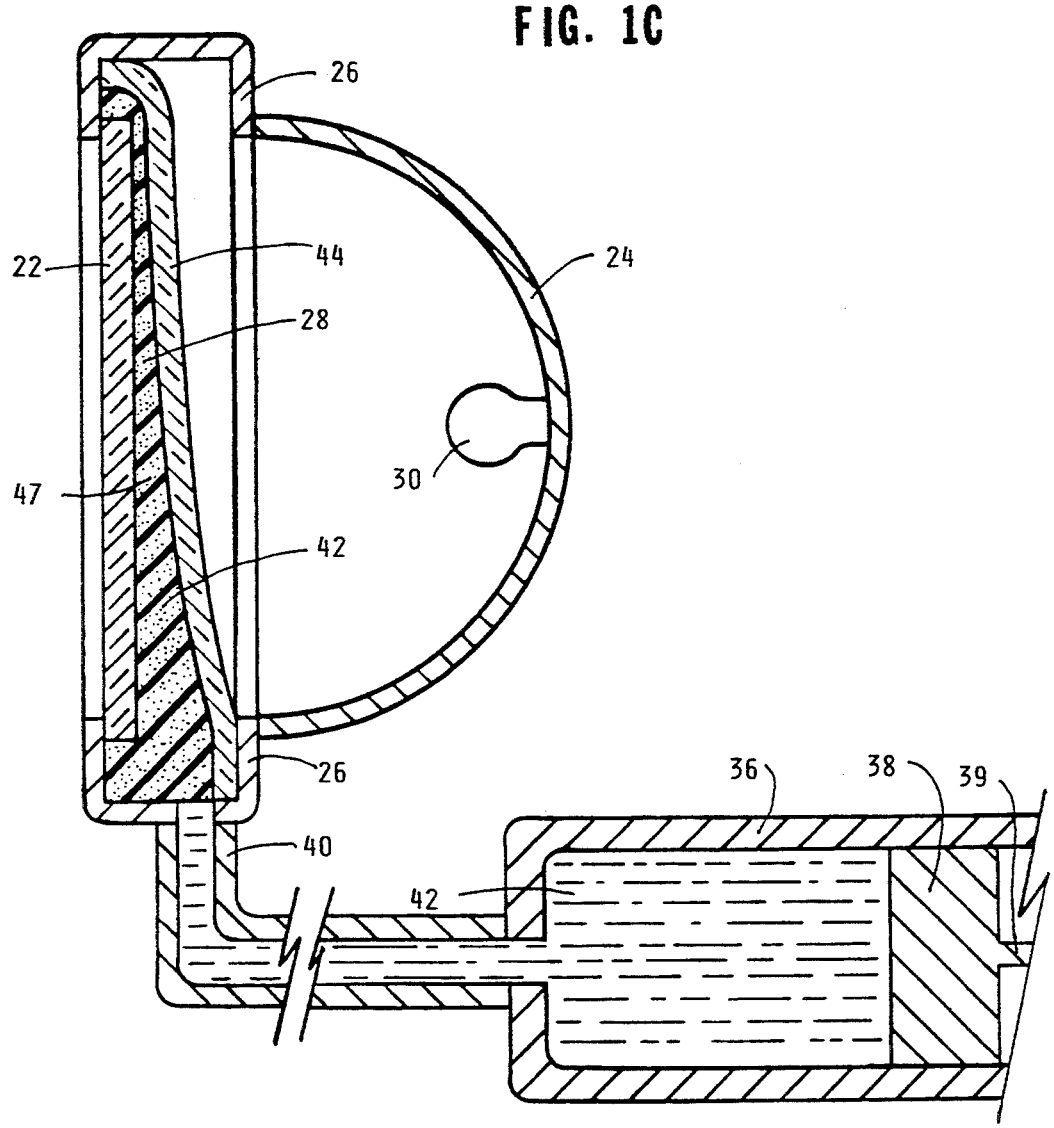
Figure 2C:
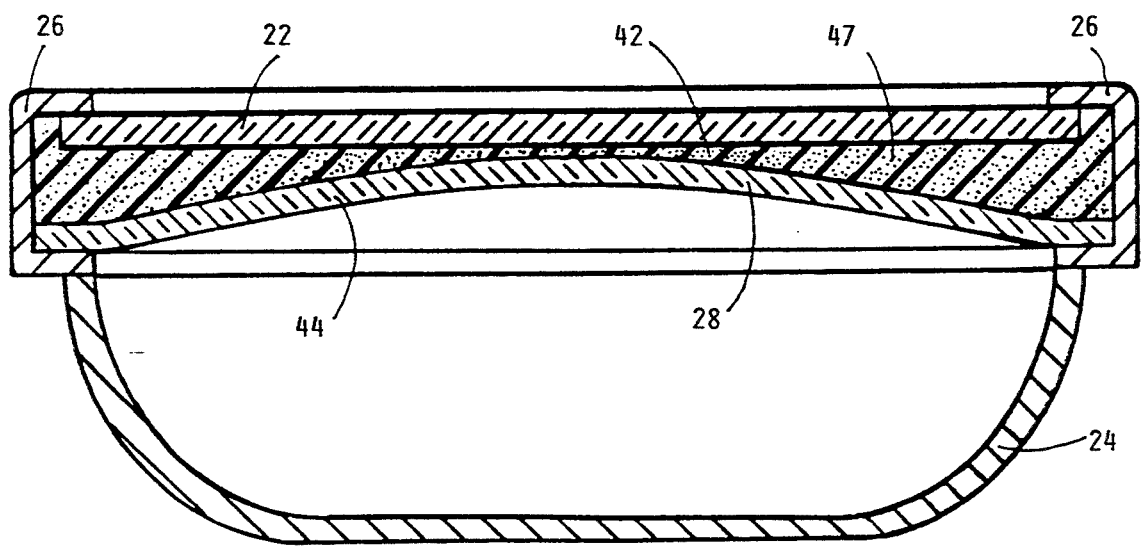

FIGS. 1C and 2C show lens assembly (21) with an additional amount of the liquid removed so that the headlight beam is further lowered and widened, making headlight assembly (20) more effective for driving in inclement weather such as snow or fog, or when driving on urban streets.

Figure 1D:
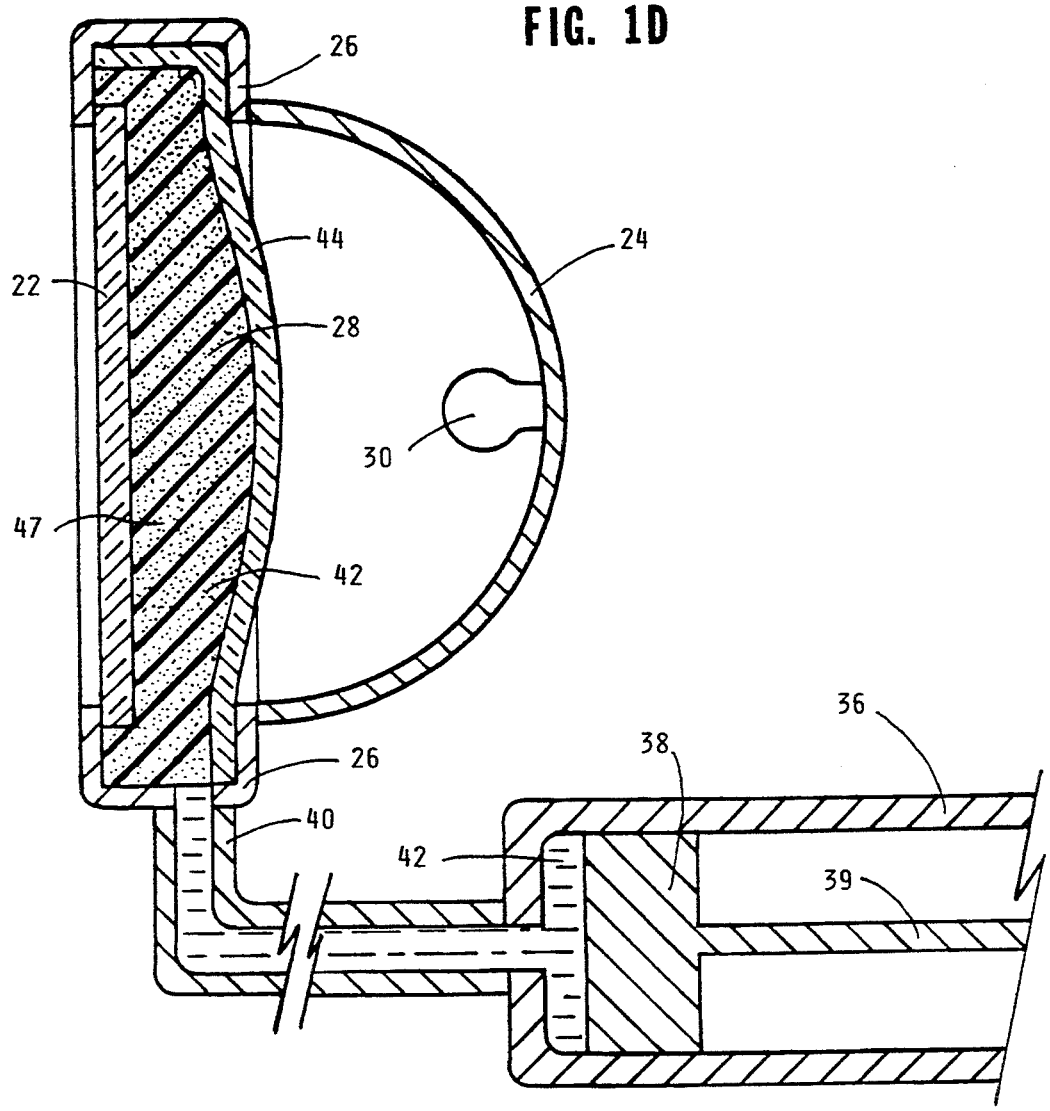
Figure 2D:
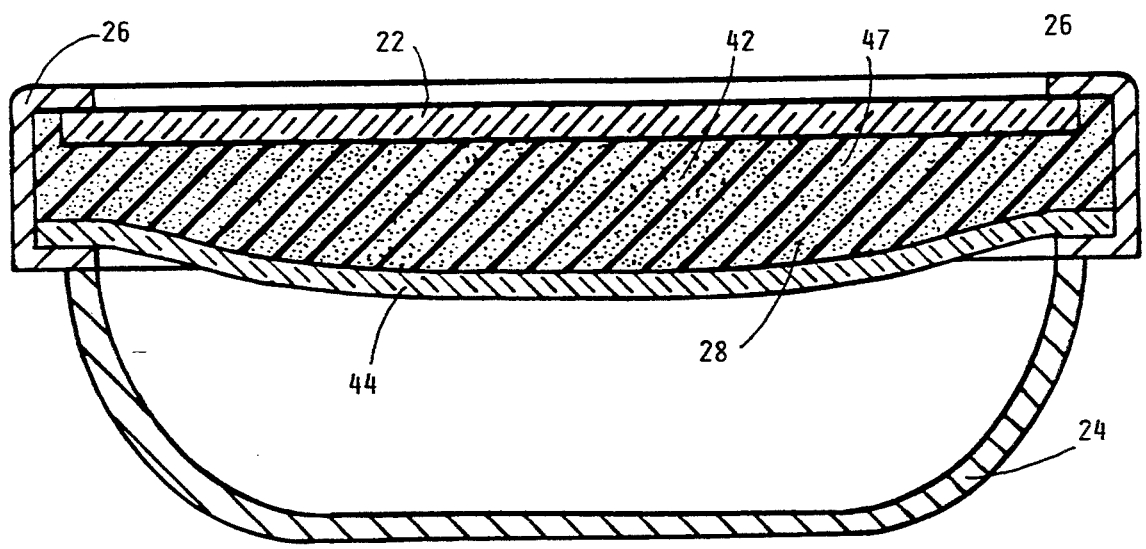

FIGS. 1D and 2D show an alternate method of changing the shape and direction of a headlight beam. This is accomplished by injecting additional liquid (42) into chamber (28) beyond the amount depicted in FIG. 1A. This creates a convex lens which is convergent. The beam would converge a short distance in front of the vehicle and then diverge.

To add more liquid to chamber (28), piston (38) is inserted further into cylinder (36) by piston rod (39) forcing liquid (42) from the cylinder into high pressure tubing (40), causing liquid to be added to the liquid already in chamber (28).

Machines such as worm gears propelled by servo motors controlled by electronic memory chips that remember several positions of adjustment are common to modern automobiles. For example such machines are used on the power seats and tilt steering wheels of luxury cars. These machines could be augmented by automatic dimmers and speed sensitive controls such as those used to adjust the valves on shock absorbers for cars with adjustable ride control.

Transparent liquid (42) used to fill lens (21) must remain in an unchanged state in whatever range of temperature and pressure it will operate; it can neither vaporize excessively nor freeze. There are several liquids that meet those conditions. 100% ethylene glycol melts at −11.5 degrees celsius and boils at 198.93 degrees celsius. Its refractive index is 1.4318 and it is colorless. In addition to being used extensively as an antifreeze for liquid cooled engines, ethylene glycol is used as a heat sink in projection TV optical systems to permit the use of smaller projection tubes that run at higher power levels. When so used ethylene glycol is placed between each of the three picture tubes and their respective lenses. The coolant transfers heat and optically connects the tubes with the lenses. Since the ethylene glycol has nearly the same optical qualities as the tubes and lenses it results in a stable, unified optical system.

Figure 2E:
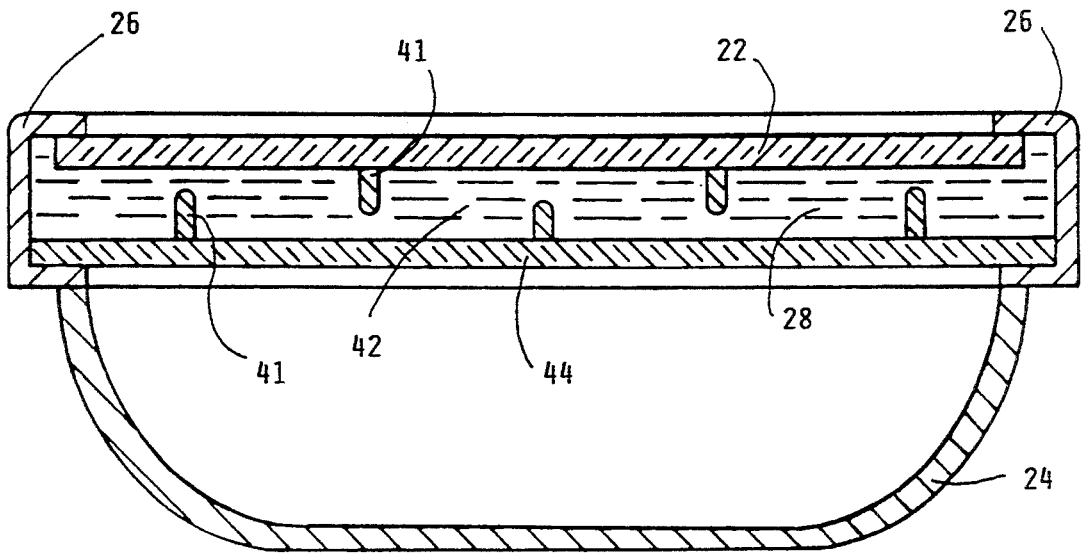

Much of the acceleration of on the road vehicles is caused by steering the vehicle to follow the road and would take the form of horizontal acceleration acting at right angles to the direction that the vehicle is traveling. This would cause the liquid to shift from side to side. FIG. 2E illustrates a second embodiment of the invention that would deal with that type of acceleration. It shows a horizontal cross section with baffles (41) in the form of ridges mounted on outer wall (22) and inner wall (44) so that they form a series of vertical weirs in chamber (28) to divert the side to side flow of the liquid. In this illustration, the baffles do not have to be flexible since they do not interfere with the movement of inner wall (44).

Figure 2F:
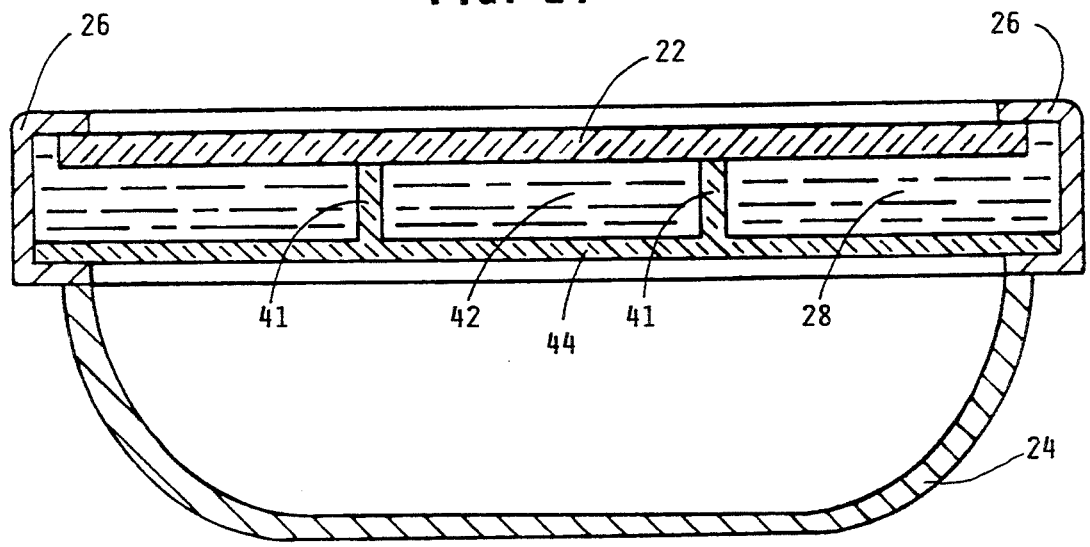
Figure 2G:
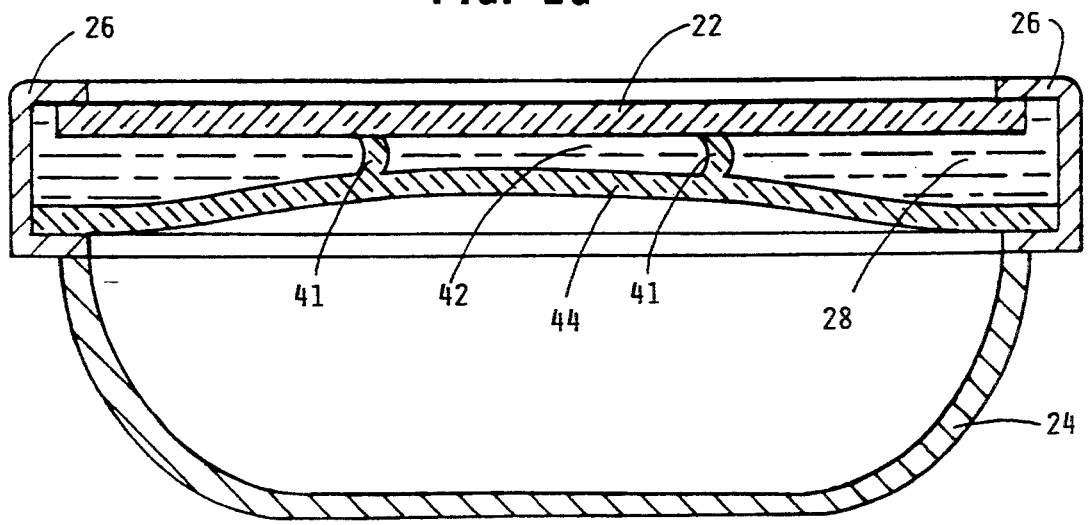

FIG. 2F illustrates a third embodiment of the invention. It shows a cross section with baffles (41) being used to divide chamber (28) into vertical compartments. These baffles would be flexible to allow lens assembly (21) to adjust as the liquid is removed as shown in FIG. 2G, and, elastic if it was desirable to add more liquid than the amount shown in FIG. 2F. The number and size of these compartments would be determined by the design and performance characteristics of the particular headlight.

Summary, Ramifications, and Scope

Accordingly, the reader will see that varying the shape of an optical element of a vehicle headlight offers simple, cost effective means of providing much more versatile illumination for automobiles and trucks. The standards for the sealed beam incandescent headlight with the high beam-low beam elements was established in the United States over 60 years ago. Since then our network of two lane city and country roads has been supplemented with systems of limited access, divided highways, and headlights with much greater candlepower have been developed. This invention will provide much more effective application of the increased candlepower resulting in greater safety and driver comfort.

Although the methods of adjusting and controlling the refractive characteristics of a variably shaped lens for the headlight of a vehicle mentioned above contain several specificities, these should not be construed as limiting the scope of the invention but as merely providing illustrations of some presently preferred embodiments of this invention. For example, in the preferred embodiment, I have illustrated headlight assembly (20) as having a jacket at atmospheric pressure. This embodiment would function also with a sealed beam headlight by rearranging the order of design so that from front to rear of headlight assembly (20), the deformable wall would be positioned first, then the chamber containing the liquid and baffle, so that the transparent rigid wall becomes the front part of the envelope for headlight assembly (20).

Other potential applications of this invention are as headlights on military vehicles and earth moving equipment to provide remote adjustment of light beams to meet the requirements of a variety of jobs. It would be useful on boats and as landing lights on aircraft.

Thus the scope of the invention should be determined by the appended claims and their legal equivalents, rather than by the examples given.

I claim:

1. A vehicle headlight comprised of:

(a) a housing fixed to the body of a vehicle, said housing having a forward light exit aperture, a light source mounted within said housing, a reflector mounted within said housing, said reflector positioned to a rear of said housing for reflecting at least some of the light rays generated by said light source through said exit aperture;

(b) a lens comprised of two transparent members, at least one of said transparent members being flexible, said transparent members and a rim defining a hollow chamber, said chamber being filled with a transparent liquid, said chamber having a port, said port being fluidly connected to an external means of adjusting the volume of said liquid in said chamber;

(c) said lens covering said aperture, the periphery of said lens being positioned in contact with said housing by said rim, whereby at least some of said light rays pass through said chamber containing said liquid;

(d) the improvement wherein said chamber contains at least one baffle, said baffle being supported by at least one said transparent member.

2. The lens of claim 1 wherein said baffle is, in part, elastic.

3. The lens of claim 1 wherein said baffle is comprised of a sponge made of rubber.

4. The lens of claim 1 wherein said baffle is, in part, transparent.

5. The lens of claim 1 wherein said baffle is configured to compart a portion of said chamber whereby the flow of a portion of said liquid is held back.

6. The lens of claim 1 wherein said baffle is configured to divert a portion of the flow of said liquid.

7. A vehicle headlight comprised of:

(a) a housing having an opening through which light is transmitted, a light source mounted within said housing, a reflector mounted within said housing, said reflector positioned at a rear of said housing, said reflector positioned to redirect light from said source through said opening;

(b) a transparent lens, said lens containing, in part, a hollow chamber, said chamber being filled with a transparent liquid, at least a portion of said lens defining said chamber being flexible, said chamber having a port, said port being fluidly connected to an external means of adjusting the volume of said liquid in said chamber;

(c) a means for mounting said transparent lens about its periphery in a fixed location enclosing said opening and said reflector, said reflector reflecting at least some of said light rays forward through said chamber and said opening;

(d) the improvement wherein said chamber contains at least one baffle, said baffle being supported by at least one surface of said chamber.

8. The lens of claim 7 wherein said baffle is, in part, elastic.

9. The lens of claim 7 wherein said baffle is comprised of a sponge made of rubber.

10. The lens of claim 7 wherein said baffle is, in part, transparent.

11. The lens of claim 7 wherein said baffle is configured to compart a portion of said chamber whereby the flow of a portion of said liquid is held back.

12. The lens of claim 7, wherein said baffle is configured to divert a portion of the flow of said liquid.

* * * * *